United States Patent [19]

Grantland

[11] Patent Number: 5,084,613
[45] Date of Patent: Jan. 28, 1992

[54] ELECTRONIC CIRCUIT FOR TELEPHONE PAYSTATION COIN OPERATED TRIGGER

[75] Inventor: Gary Grantland, Hartselle, Ala.

[73] Assignee: Quadrum Telecommunications, Inc., Arab, Ala.

[21] Appl. No.: 658,549

[22] Filed: Feb. 21, 1991

[51] Int. Cl.$^5$ .................. H04M 17/02; G07F 3/04
[52] U.S. Cl. ...................... 250/223 R; 250/222.1; 453/4; 379/148
[58] Field of Search .................. 250/222.1, 223 R; 453/4; 209/576; 379/148

[56] References Cited

U.S. PATENT DOCUMENTS

| | | | |
|---|---|---|---|
| 3,680,566 | 8/1972 | Tanuka et al. | 453/4 |
| 4,436,103 | 3/1984 | Dick | 453/4 |
| 4,988,860 | 1/1991 | Wollet et al. | 250/223 R |

*Primary Examiner*—Carolyn E. Fields
*Attorney, Agent, or Firm*—Robert J. Black

[57] ABSTRACT

A circuit operated in response to deposit of a coin through a trigger switch to selectively operate one of a plurality of signal generators. When coins are deposited through said coin trigger switch, blocking light from a light source to a light detection means, an associated signal driver activates a selected tone signal generator.

16 Claims, 1 Drawing Sheet

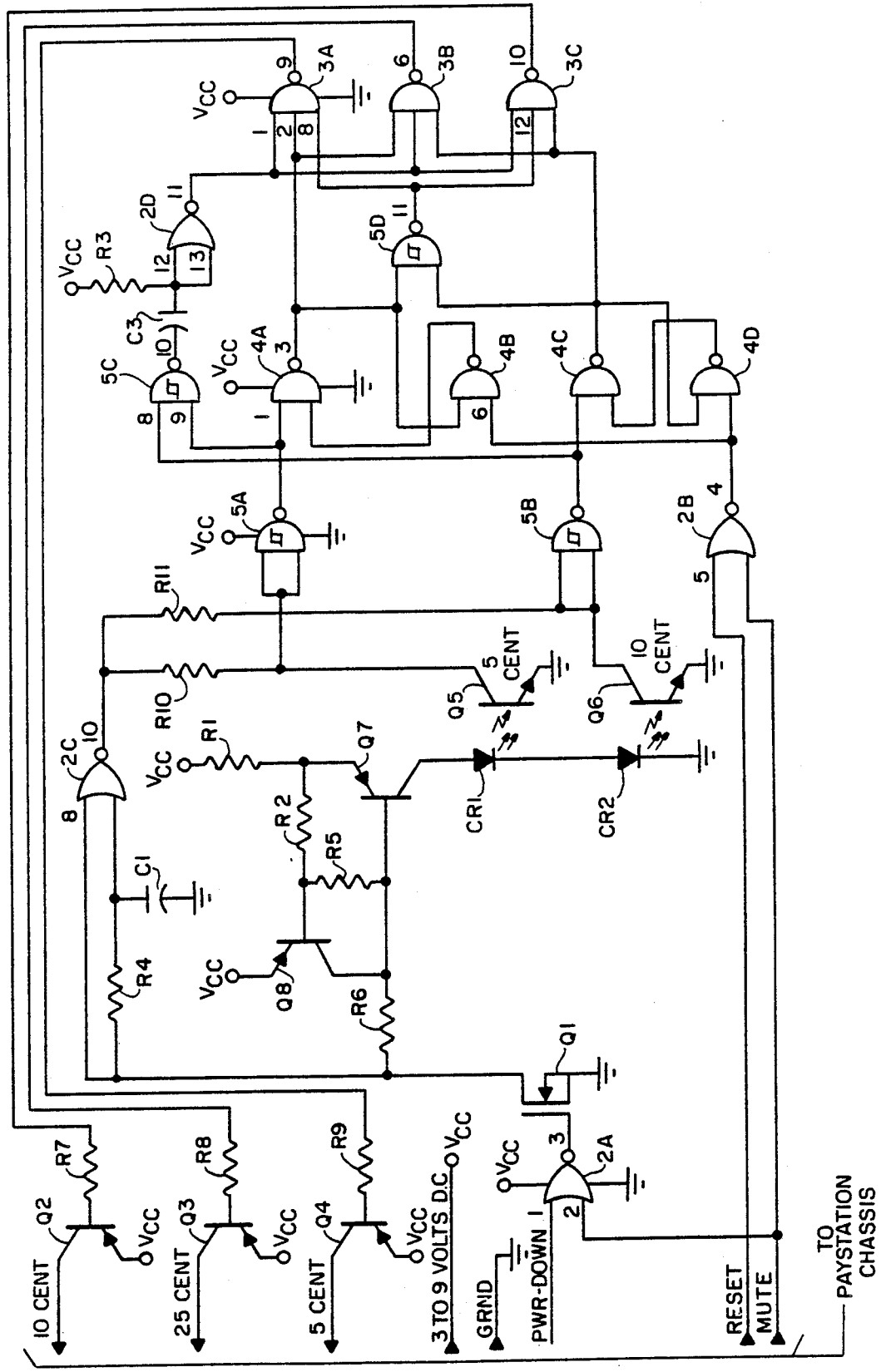

ELECTRONIC CIRCUIT FOR TELEPHONE PAYSTATION COIN OPERATED TRIGGER

BACKGROUND OF THE INVENTION

1. Field of the Invention

The present invention relates to coin operated devices and more particularly to an eletronic circuit for use with a coin operated trigger switch as used in telephone paystations.

2. Background Art

The present invention is suitable for use in telephone paystations similar to those in current use and particularly for use in such telephone paystations as the type 120B paystation telephones currently manufactured by Quadrum Telecommunications, Inc.

In such units in response to the deposit of coins in the appropriate amount, signals are transmitted to the telephone central office to indicate the value and number of coins deposited.

Many different types of coin trigger devices have been employed for use in telephone paystations or in other coin collecting machines. Such triggers typically find their usage between a coin acceptor/rejector, which determines whether the coins are valid or not, and the associated coin hopper and/or relay. Such coin trigger devices employ various methods of identifying and counting coins. The circuit of the present invention is intended for use with a coin operated trigger mechanism as disclosed in U.S. Pat. No. 4,988,860 which issued to W. Wollet and the inventor of the present application on Jan. 29, 1991. This mechanism was intended to replace traditional coin chutes as utilized in pay telephones although it may be modified for use in other applications.

Prior art coin chutes include coin operated trigger cams and spring contacts and an assembly consisting of three channels; the three channels being associated with the deposit of nickels, dimes and quarters. In the prior art devices, the trigger cam in each channel of the prior art trigger arrangements operate a spring contact assembly for each coin deposited. The springs contacts then operated associated coin signal generators which then applied the necessary signals to the telephone line for transmission to the central office for identification of the coins deposited in the paystation.

The trigger switch mechanism of the above identified patent utilized two light sources or emitters on one side of a multi-element coin chute with the other side including two light detectors. A light beam produced by a light emitter passed through openings in each of the elements of the multi-element coin chute portion of the invention so that when a light beam is broken by a coin passing between two of the elements, the light will be broken and the opposite detector will sense the absence of light from the light emitter and then generate an appropriate signal. Accordingly, it is the object of the present invention to provide electronic circuitry utilizing outputs from such light detectors to determine what the quantity and values of the coins deposited are in response to deposit of coins from the specifically arranged channels of the identified trigger mechanism so that dimes will break one light path, a nickel the other, and a quarter will break both light paths.

SUMMARY OF THE INVENTION

In combination with the above identified trigger switch arrangement, the electronic circuitry of the present invention utilizes a completely different concept for identification of coins over that taught by the background art. The present circuitry is mounted on two small printed wiring cards mounted on each side of the above identified multi-element coin chute. One of these printed circuit cards contains the indicated two light emitters while the other includes the two light detectors. The present circuitry utilizes power from the electronic chassis of the type 120B or similar paystation in response to three available control signals therefrom (power down, reset and mute) and drives appropriate five cent, ten cent, and twenty-five cent input signals to the 120B chassis where corresponding coin signal generators are located operating those generators to provide the necessary signals for coin identification to the telephone central office over the telephone line.

The electronic coin trigger circuitry of the present invention receives power from the paystation chassis whether the phone is in the "off-hook" or "on-hook" condition. When the phone is "off-hook", the electronic trigger circuit utilizes approximately 0.3 milliamperes of current to drive the infrared light emitters. When the phone is "on-hook", a power down signal from the paystation chassis turns off the drive current to the infrared light emitters. When coin tones are being transmitted by the paystation chassis, the mute signal from the chassis also turns off the drive current to the infrared light emitters.

The phototransistors placed on the opposite side of the coin trigger switch as light detectors sense an absence of light from the infrared emitters when a coin passes between the emitter and the phototransistor. This arrangement requires the phototransistors output to be disabled when the infrared emitters are turned off. This is done by removing power to the pull up resistors on the collectors of the phototransistors. A gate circuit with a resistor/capacitor time delay allows the phototransistors to be disabled immediately when power is removed from the infrared emitters, but provides a time delay before the phototransistors are enabled when power is reapplied to the infrared emitters.

Each phototransistor output is buffered before driving reset/set latch. A latch is used because the quarter input may not break both light paths at exactly the same time. The phototransistor outputs can vary five milliseconds with a quarter input but the input signal will last for at least 15 milliseconds. Therefore, the first phototransistor to turn off after a quarter deposit triggers a gate circuit which enables the five, ten and twenty-five cent decoders.

The open collector PNP transistor output drivers signal the appropriate coin signal to the paystation electronic chassis. At that time the chassis, which includes a number of coin signal generators for each value of coin, provides the necessary tone signals to the telephone central office. The circuitry included on the 120B chassis also provides a mute signal during coin tone signalling which is used to reset the two reset/set latches. A reset signal is also used to clear the two reset/set latches when going "off-hook".

BRIEF DESCRIPTION OF THE DRAWINGS

FIG. 1 of the present drawings is a schematic circuit diagram of the electronic circuitry for use with a coin trigger as utilized in type 120B and similar telephone paystations.

DESCRIPTION OF THE PREFERRED EMBODIMENT

Referring now to the single figure of accompanying drawings, the two infrared light emitting diodes CR1 and CR2 are connected in series and powered by a current source consisting of transistor Q1, Q7 and Q8, as well as resistors R1, R2, R5 and R6. When transistor Q1 is turned on, current through resistor R6 turns transistor Q7 on. The amount of current through transistor Q7 is controlled by resistor R1 and the base to emitter clamp of resistors R2, R5, and transistor Q8. The current source is used because the DC supply (VCC) can range from three to nine volts DC.

Transistor Q1 is used as an on/off switch for the current source. Transistor Q1 is driven by a NOR gate consisting of integrated circuit 2A. The power down input on pin 1 comes from the associated paystation chassis and the mute input on pin 2 which comes from the same source are both normally low. Either input going high will turn off the current source.

Transistors Q5 and Q6 are both phototransistors which respond to infrared light emitting diodes CR1 and CR2, respectively. Both phototransistors have pull up resistors with integrated circuit 2C which functions as a NOR gate. Integrated circuit 2C output is high when transistor Q1 is turned on. Resistor R4 and capacitor C1 connected to pin 9 of integrated circuit 2C provide a delay so that the output pin 10 is delayed going high. This provides time for transistors Q5 and Q6 to respond to the infrared light before applying power to pull up resistors R10 and R11.

Integrated circuits 5A and 5B are used as buffers and inverters for phototransistors Q5 and Q6, respectively. Integrated circuits 4A and 4B are both two input NAND gates and wired together as a reset/set latch (bistable) with active low inputs functioning as the five cent latch or in operation to the deposit of five cent coins. When integrated circuit 4A input pin 1 goes low, the output pin 3 goes high and integrated circuit 4B pin 4 goes low. This latch will remain in this condition until integrated circuit 4B pin 6 input goes low, which then causes pin 4 to go high and pin 3 to go low.

Phototransistor Q5 responds as indicated to the deposit of five cent coins by providing a high signal at its collector. This signal is then inverted by integrated circuit 5A which sets the latch consisting of integrated circuits 4A and 4B. In a like manner, integrated circuits 4C and 4D form another reset/set latch (bistable) which responds in turn to ten cent coins. The ten cent latch functions in response to operation of transistor Q6 inverted output through integrated circuit 5B. Should a twenty-five cent coin be deposited, light from both light emitting diodes CR1 and CR2 is broken from their related phototransistors Q5 and Q6, respectively, to cause both latches consisting of the nickel latch, including integrated circuits 4A and 4B in the ten cent latch, using integrated circuits 4C and 4D to operate. Integrated circuit 5D is a two input NAND gate which monitors the five cent and ten cent latches. When both latches are set, integrated circuit 5D output pin 11 is low indicating a twenty-five cent deposit. Integrated circuit 3A is a three input NAND gate which monitors the five cent latch at pin 2, the twenty-five cent active low signal at pin 8 at an output enable signal at pin 1. When the five cent latch previously identified is set, the twenty-five cent signal is high (indicating both latches are not set) and the output enable pin (pin 11 integrated circuit 2D) is high, then integrated circuit 3A pin 9 output goes low which turns on transistor Q4. Transistor Q4 indicates deposit of a five cent coin and is extended back to the paystation chassis and particularly to a five cent tone generator located thereon.

In a like manner, integrated circuit 3C and transistor Q2 will decode and activate a ten cent coin tone generator also located on the paystation chassis.

If integrated circuit 5D output is low, indicating a twenty-five cent coin deposit, both integrated circuits 3A and 3C input pins 8 and 12, respectively, will disable the five cent and ten cent outputs. Integrated circuit 3D monitors both the five cent and ten cent latches and the output enable. When integrated circuit 3B pin 6 output gate goes low, transistor Q3 will signal a twenty-five cent coin deposit. This signal likewise will be extended to the chassis of the paystation where the associated twenty-five cent tone generator will be actuated.

Integrated circuit 5C input pins 8 and 9 monitor the inputs to the five and ten cent latches. Both inputs are normally high and the output pin 10 is normally low. When either input to integrated circuit 5C goes low, the output goes high. This then has no effect on the output of integrated circuit 2D because both inputs at pins 12 and 13 are normally high. When either or both inputs to integrated circuit 5C go high, the output will go low. The inputs to integrated circuit 2D pins 12 and 13 will be pulled low through capacitor C3 until such time as capacitor C3 charges through resistor R3. This then causes a positive pulse at integrated circuit 2D pin 11 which is used as an output enable for integrated circuits 3A, 3B and 3C.

Integrated circuit 2B is a two input NOR gate with both inputs normally low. The reset input at pin 5 of integrated circuit 2B is supplied from the paystation chassis. This signal will produce a high pulse when the phone goes "off-hook". This signal is inverted at pin 4 of integrated circuit 2B and resets both the five and ten cent latches. In a like manner, the mute input signal at pin 6 of integrated circuit 2B, goes high during an active coin tone signal period and will reset both the five and ten cent latches.

From the foregoing it can been seen that by deposit of coins in a trigger switch such as that disclosed in the previously noted patent, signals are developed which are then conditioned by the circuitry of the present invention to provide operating signals for tone generators included on typical paystation chassis, particularly such as those as the type 120B paystation previously identified.

While but a single embodiment of the present invention has been shown, it will be obvious to those skilled in the art that numerous modifications may be made without departing from the spirit of the present invention which shall be limited only by the scope of the claims appended hereto.

What is claimed is:

1. In a telephone paystation, a coin operated trigger switch, a plurality of tone signal generators, a source of operating voltage, a source of control signals and circuit means operated to selectively operate one of said signal generators, said circuit means comprising:

a first latch operated in response to a first light detection means when a coin of a first value is deposited through said coin trigger switch, blocking light from a first light source to said first light detection means, to operate a first signal driver to operate a first one of said tone signal generators;

a second latch operated in response to a second light detection means when a coin of a second value is deposited through said coin trigger switch, blocking light from a second light source to said second light detection means, to operate a second signal driver to operate a second one of said tone signal generators;

said first and second latches both operated in response to said first and second light detection means when a coin of a third value is deposited through said coin trigger switch, blocking light from both said first and second light sources to both said first and second light detection means, to disable said signal drivers associated with said first and second value coins and operate a third signal driver to operate a third one of said signal generators.

2. Circuit means as claimed in claim 1 wherein:
said first and second light sources each comprise a light emitting diode.

3. Circuit means as claimed in claim 2 wherein:
the light emitting diodes each produce infrared light.

4. Circuit means as claimed in claim 1 wherein:
said first and second light detection means each comprise a photosensitive transistor.

5. Circuit means as claimed in claim 1 wherein:
said first and second latches each comprise a plurality of gate circuits arranged to facilitate the operation of each of said latches on a bistable basis.

6. Circuit means as claimed in claim 1 wherein:
each of said signal drivers comprise a transistor.

7. Circuit means as claimed in claim 1 wherein:
there is further included enabling means connected to said first and second light detectors operated in response to deposit of a coin of any value through said coin operated trigger switch to condition said signal drivers means for operation in response to said first and second latches.

8. Circuit means as claimed in claim 7 wherein:
said enabling means comprise in series connection, an inverter buffer including circuit connections to said light detection means and a conditioning gate including circuit connections to said signal drivers.

9. Circuit means as claimed in claim 1 wherein:
there is further included a current source operated in response to a first control signal from said telephone paystation to connect said operating voltage source to said first and second light sources and said first and second light detection means.

10. Circuit means as claimed in claim 9 wherein:
said current source further includes a switch operated in response to said first control signal from said telephone paystation to operate said current source.

11. Circuit means as claimed in claim 1 wherein:
there is further included a first signal gate connected between said first latch and said first signal driver and a second signal connected gate between said second latch and said second signal driver.

12. Circuit means as claimed in claim 11 wherein:
there is further included a third signal gate connected to said third signal driver including circuit connections to said first and second signal gate circuits and also including input circuits from said first and second latches;

said third signal gate operated in response to operation of said first and second latches to operate said third signal driver, and to disable said signal gate circuits associated with said first and second drivers.

13. Circuit means as claimed in claim 8 wherein:
there is further included time delay means connected between said buffer and said conditioning gate.

14. Circuit means as claimed in claim 10 wherein:
there is further included time delay means connected between said switch and said light detection means.

15. Circuit means as claimed in claim 1 wherein:
there is further included inverter buffers connected between said light detection means and the associated latches.

16. Circuit means as claimed in claim 1 wherein:
there is further included a reset gate connected between a source of second and third control signals included in said telephone paystation operated in response to either of said control signals to reset said first and second latches.

* * * * *